(12) United States Patent
Kumar et al.

(10) Patent No.: US 11,150,424 B2
(45) Date of Patent: Oct. 19, 2021

(54) ROLLABLE OPTICAL FIBER RIBBON

(71) Applicant: Sterlite Technologies Limited, Maharashtra (IN)

(72) Inventors: Sravan Kumar, Maharashtra (IN); Venkatesh Murthy, Maharashtra (IN); Kishore Sahoo, Maharashtra (IN)

(73) Assignee: Sterlite Technologies Limited, Aurangabad (IN)

( * ) Notice: Subject to any disclaimer, the term of this patent is extended or adjusted under 35 U.S.C. 154(b) by 0 days.

(21) Appl. No.: 16/262,628

(22) Filed: Jan. 30, 2019

(65) Prior Publication Data

US 2020/0183110 A1 Jun. 11, 2020

(30) Foreign Application Priority Data

Dec. 6, 2018 (IN) .............................. 201821046208

(51) Int. Cl.
*G02B 6/44* (2006.01)
*G02B 6/02* (2006.01)

(52) U.S. Cl.
CPC ....... *G02B 6/4403* (2013.01); *G02B 6/02333* (2013.01); *G02B 6/02357* (2013.01); *G02B 6/4429* (2013.01)

(58) Field of Classification Search
CPC .......................... G02B 6/4403; G02B 6/02333; G02B 6/4429; G02B 6/02357
See application file for complete search history.

(56) References Cited

U.S. PATENT DOCUMENTS

| 4,271,104 A | * | 6/1981 | Anderson | G02B 6/448 264/1.24 |
| 5,985,376 A | * | 11/1999 | Kamen | B41F 23/005 118/58 |
| 6,283,022 B1 | * | 9/2001 | Kamen | B41F 15/12 101/129 |
| 6,314,214 B1 | * | 11/2001 | Walter | G01M 11/088 385/13 |
| 6,366,711 B2 | * | 4/2002 | Walter | G01M 11/088 385/13 |

(Continued)

FOREIGN PATENT DOCUMENTS

JP 2017-26754 A † 2/2017

OTHER PUBLICATIONS

Reference number list for U.S. Patent Application Publication No. 2018/0074261 of Burek et al. (Burek) (Year: 2021).*

(Continued)

*Primary Examiner* — Andrew Jordan

(57) ABSTRACT

The present disclosure provides a rollable optical fiber ribbon. The rollable optical fiber ribbon includes a plurality of optical fibers positioned along a longitudinal axis of the rollable optical fiber ribbon. In addition, the rollable optical fiber ribbon includes a matrix material covering the plurality of optical fibers. Each of the plurality of optical fibers is placed adjacent to other optical fiber of the plurality of optical fibers. Each of the plurality of optical fibers with a diameter of about 210±5 micron is spaced at a pitch in a range of about 250 microns to 255 microns. The rollable optical fiber ribbon is corrugated from a first side and a second side to enable rolling of the rollable optical fiber ribbon in circular fashion.

21 Claims, 1 Drawing Sheet

(56) References Cited

U.S. PATENT DOCUMENTS

| | | | |
|---|---|---|---|
| 6,490,378 B2* | 12/2002 | Walter | G01M 11/088 385/13 |
| 6,601,502 B2* | 8/2003 | Kamen | B41F 15/30 101/129 |
| 6,671,441 B1* | 12/2003 | Bocanegra | G02B 6/443 385/112 |
| 6,684,770 B2* | 2/2004 | Kamen | B41F 15/0872 101/119 |
| 7,151,879 B2* | 12/2006 | Ishikawa | G02B 6/4403 385/114 |
| 8,787,718 B2* | 7/2014 | Tanabe | G02B 6/4405 385/102 |
| 9,547,096 B1* | 1/2017 | Kumar | G01V 1/226 |
| 9,625,667 B2* | 4/2017 | Kumar | G02B 6/4413 |
| 9,880,368 B2* | 1/2018 | Debban | G02B 6/4483 |
| 9,995,896 B2* | 6/2018 | Namazue | G02B 6/4403 |
| 10,185,089 B2* | 1/2019 | Burek | G02B 6/2553 |
| 10,185,105 B2* | 1/2019 | Risch | G02B 6/4403 |
| 10,261,278 B1* | 4/2019 | Murthy | G02B 6/4415 |
| 10,330,876 B2* | 6/2019 | Chiasson | G02B 6/4403 |
| 10,379,306 B2* | 8/2019 | Bringuier | G02B 6/4403 |
| 10,649,163 B2* | 5/2020 | Bookbinder | G02B 6/4429 |
| 2001/0031108 A1* | 10/2001 | Walter | G01B 11/18 385/13 |
| 2001/0042456 A1* | 11/2001 | Kamen | B41F 15/0872 101/38.1 |
| 2002/0057859 A1* | 5/2002 | Walter | G01B 11/18 385/13 |
| 2003/0121428 A1* | 7/2003 | Kamen | B41F 15/44 101/38.1 |
| 2004/0146255 A1† | 7/2004 | Ishikawa | |
| 2014/0016905 A1* | 1/2014 | Tanabe | G02B 6/4403 385/114 |
| 2016/0147028 A1* | 5/2016 | Kumar | G02B 6/4413 385/103 |
| 2016/0161692 A1* | 6/2016 | Namazue | G02B 6/4403 385/114 |
| 2017/0115461 A1* | 4/2017 | Namazue | G02B 6/4403 |
| 2017/0184803 A1* | 6/2017 | Namazue | G02B 6/4403 |
| 2017/0219790 A1* | 8/2017 | Debban | G02B 6/4403 |
| 2017/0219792 A1* | 8/2017 | Debban | G02B 6/4483 |
| 2018/0031792 A1* | 2/2018 | Risch | G02B 6/4403 |
| 2018/0074261 A1* | 3/2018 | Burek | G02B 6/2553 |
| 2018/0149821 A1* | 5/2018 | Bringuier | B29C 64/153 |
| 2018/0348460 A1* | 12/2018 | Sahoo | G02B 6/4436 |
| 2019/0049681 A1* | 2/2019 | Bookbinder | G02B 6/4404 |
| 2019/0064469 A1* | 2/2019 | Kumar | G02B 6/4498 |
| 2019/0113701 A1* | 4/2019 | Murthy | G02B 6/4415 |
| 2019/0219783 A1* | 7/2019 | Ly | G02B 6/3696 |
| 2019/0229513 A1* | 7/2019 | Peraka | H02G 1/08 |
| 2019/0250346 A1* | 8/2019 | Murthy | G02B 6/4402 |
| 2019/0250347 A1* | 8/2019 | Fallahmohammadi | C03C 25/1065 |
| 2019/0250358 A1* | 8/2019 | Murthy | G02B 6/4402 |
| 2020/0132952 A1* | 4/2020 | Debban | G02B 6/4494 |
| 2020/0183110 A1* | 6/2020 | Kumar | G02B 6/02333 |
| 2020/0183113 A1* | 6/2020 | Kumar | G02B 6/4435 |
| 2020/0249406 A1* | 8/2020 | Bookbinder | G02B 6/4432 |

OTHER PUBLICATIONS

Reference number list for U.S. Patent Application Publication No. 2018/0031792 of Risch et al. (Risch) (Year: 2021).*

Reference number list for U.S. Patent Application Publication No. 20200183110 of Kumar et al. (Kumar, the present application) (Year: 2021).*

TELECORDIA; "Generic Requirements for Optical Fiber and Optical Fiber Cable"; Issue 4, Jul. 2013; Telecordia Technologies Generic Requirements.†

* cited by examiner
† cited by third party

100
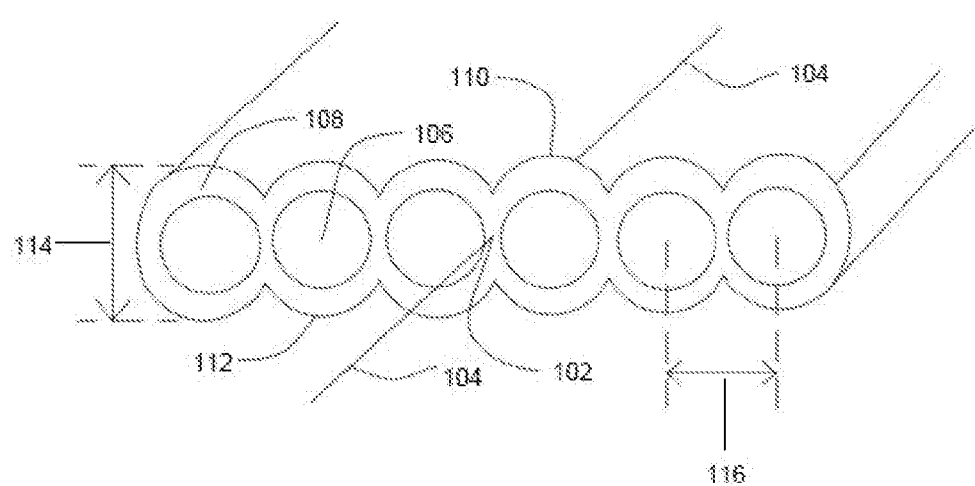

ROLLABLE OPTICAL FIBER RIBBON

BACKGROUND

Field of the Invention

The present disclosure relates to a field of optics and, in particular, the present disclosure relates to a rollable optical fiber ribbon.

Description of the Related Art

Over the last few years, optical fibers are widely used for communication to meet the increasing demands. The increasing demand of optical fibers leads to the installation of high-capacity optical fiber cables. The high capacity optical fiber cables include a large number of optical fibers inside the cable. The optical fibers may be in the form of optical fiber ribbons. Typically, the optical fiber ribbons in the cable provide an advantage of mass fusion splicing which reduces the splicing time. However, this increases the overall diameter of the optical fiber cable. Also, the large dimensions of the optical fiber ribbons lead to the increase of diameter of the optical fiber cable.

In light of the above stated discussion, there is a need for such optical fiber ribbons which can overcome the above cited drawbacks.

BRIEF SUMMARY OF THE INVENTION

In an aspect, the present disclosure provides a rollable optical fiber ribbon. The rollable optical fiber ribbon includes a plurality of optical fibers positioned along a longitudinal axis of the rollable optical fiber ribbon. In addition, the rollable optical fiber ribbon includes a matrix material covering the plurality of optical fibers to provide flexibility to the rollable optical fiber ribbon. The matrix material is made of curable UV acrylate. The matrix material has elongation of about 55% and tensile strength of about 15 mega Pascal. The matrix material has secant modulus of about 49 mega Pascal at 2.5% strain. The matrix material has degree of cure of about 0.5. Each of the plurality of optical fibers is placed adjacent to other optical fiber of the plurality of optical fibers. Each of the plurality of optical fibers with a diameter of about 210±5 micron is spaced at a pitch in a range of about 250 microns to 255 microns. The rollable optical fiber ribbon is corrugated from a first side and a second side to enable rolling of the rollable optical fiber ribbon in circular fashion. The rollable optical fiber ribbon facilitates mass fusion splicing operation along with reduction in cable diameter. The rollable optical fiber ribbon has a height in a range of about 250 microns to 300 microns.

A primary object of the present disclosure is to provide an easy splice rollable optical fiber ribbon.

Another object of the present disclosure is to provide the rollable optical fiber ribbon with both side corrugations.

Yet another object of the present disclosure is to provide the rollable optical fiber ribbon for reducing splicing time.

Yet another object of the present disclosure is to provide the rollable optical fiber ribbon with reduced dimensions.

In an embodiment of the present disclosure, the matrix material is made of curable UV acrylate.

In an embodiment of the present disclosure, each of the plurality of optical fibers has a diameter of about 210±5 micron.

In an embodiment of the present disclosure, the matrix material has elongation of about 55% and tensile strength of about 15 mega Pascal.

In an embodiment of the present disclosure, the matrix material has secant modulus of about 49 mega Pascal at 2.5% strain. In addition, the matrix material has degree of cure of about 0.5. Further, the matrix material in the form of 250 micro meter film coating absorbs 3.0% water when immersed in water for 24 hours. Furthermore, cured coating of the matrix material has glass transition temperature of about −18 degree Celsius at 1000 mega Pascal. The cured coating of the matrix material has glass transition temperature of about −28 degree Celsius at 100 mega Pascal.

In an embodiment of the present disclosure, the matrix material in liquid form has a viscosity of about 9000 milli Pascal second at 25 degree Celsius. In addition, the matrix material in liquid form has density of about 1110 kilogram per cubic meter at 23 degree Celsius.

In an embodiment of the present disclosure, the rollable optical fiber ribbon has a height in a range of about 250 microns to 300 microns.

In an embodiment of the present disclosure, the rollable optical fiber ribbon has width of about 720 micro meters corresponding to 2 optical fibers. In addition, the rollable optical fiber ribbon has width of about 1220 micro meters corresponding to 4 fibers. Further, the rollable optical fiber ribbon has width of about 1648 micro meters corresponding to 6 fibers. Furthermore, the rollable optical fiber ribbon has width of about 2172 micro meters corresponding to 8 fibers. Moreover, the rollable optical fiber ribbon has width of about 3220 micro meters corresponding to 12 fibers.

In an embodiment of the present disclosure, each of the plurality of optical fibers is placed by a distance in a range of about 35 microns to 50 microns from each other.

In an embodiment of the present disclosure, the corrugation on the first side and the second side of the rollable optical fiber ribbon enables the rolling of the rollable optical fiber ribbon in clockwise direction and in anti-clock wise direction.

In an embodiment of the present disclosure, the rollable optical fiber ribbon includes a number of optical fibers in a range of about 4 to 12.

In an embodiment of the present disclosure, the pitch is defined as a distance between centres of two adjacent fibers of the plurality of optical fibers. In addition, the pitch in the range of about 250 microns to 255 microns in the rollable optical fiber ribbon enables quick splicing of the rollable optical fiber ribbon.

In an embodiment of the present disclosure, the matrix material is applied throughout the plurality of optical fibers to restrict the movement of fibers during splicing operations.

DESCRIPTION OF THE DRAWINGS

Having thus described the disclosure in general terms, reference will now be made to the accompanying figures, wherein:

FIG. 1 illustrates a cross sectional view of a rollable optical fiber ribbon, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. The rollable optical fiber ribbon.
102. Geometrical centre.
104. Longitudinal axis.
106. Plurality of optical fibers.
108. The matrix material.
110. The first side.
112. The second side.
114. The height of the rollable optical fiber ribbon.
116. The pitch

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view of a rollable optical fiber ribbon 100, in accordance with an embodiment of the present disclosure. The rollable optical fiber ribbon 100 is a type of optical fiber ribbon which facilitates in increasing optical fiber density of a cable. The rollable optical fiber ribbon 100 is defined by a longitudinal axis 104 passing through a geometrical centre 102. In general, the longitudinal axis is an imaginary axis along the lengthwise direction of the figure or body, usually passing through its center of gravity or geometrical center. In addition, the geometrical centre 102 can be defined as the midpoint of the rollable optical fiber ribbon 100 across cross section. In an embodiment of the present disclosure, the geometrical centre 102 can be defined as an imaginary point in the middle of the rollable optical fiber ribbon 100.

The rollable optical fiber ribbon 100 includes a plurality of optical fibers 106. In addition, each of the plurality of optical fibers 106 is placed adjacent to another optical fiber of the plurality of optical fibers 106. In an embodiment of the present disclosure, each of the plurality of optical fibers 106 is positioned along the longitudinal axis 104 of the rollable optical fiber ribbon 100. In an embodiment of the present disclosure, each of the plurality of optical fibers 106 is parallel to other optical fiber of the plurality of optical fibers 106. In addition, each optical fiber of the plurality of optical fibers 106 is placed adjacent to the other optical fiber of the plurality of optical fibers 106. Further, each of the plurality of optical fibers 106 has a diameter in a range of about 210 microns±5 microns. (Kindly confirm the diameter of the optical fiber). Furthermore, each of the plurality of optical fibers 106 is spaced at a pitch 116 in a range of about 250 microns to 255 microns. In general, the pitch is defined as the distance between successive corresponding points or lines. In an embodiment of the present disclosure, the pitch 116 is defined as the distance between the centres of two adjacent fibers of the plurality of optical fibers 106.

In general, the optical fiber is a fiber used for transmitting information as light pulses from one end to another. In addition, the optical fiber is a thin strand of glass or plastic capable of transmitting optical signals. Further, the optical fiber is configured to transmit large amount of information over long distances. Furthermore, the optical fiber includes a core region and a cladding region. The core region is an inner part of the optical fiber and the cladding section is an outer part of the optical fiber. The cladding region surrounds the core region. Moreover, the core region and the cladding region are formed during the manufacturing stage of the optical fiber. The core region has a refractive index which is greater than a refractive index of the cladding region. In an embodiment of the present disclosure, the core region has a higher refractive index than the cladding region to transmit information from one end to another end. In an embodiment of the present disclosure, the optical fiber is a single mode optical fiber. In another embodiment of the present disclosure, the optical fiber is a multimode optical fiber.

The rollable optical fiber ribbon 100 includes the plurality of optical fibers 106. The rollable optical fiber ribbon 100 is an arrangement of coated optical fibers placed side by side. The coating covers the plurality of optical fibers 106. The coating is made of a matrix material 108. In an embodiment of the present disclosure, the rollable optical fiber ribbon 100 is a flexible optical fiber ribbon. The matrix material 108 imparts flexibility to the rollable optical fiber ribbon 100. The matrix material 108 refers to a material with which the rollable optical fiber ribbon 100 is manufactured.

The flexibility of the rollable optical fiber ribbon 100 enables it to roll easily. Further, flexibility is the property of the material with which the rollable optical fiber ribbon 100 is made. Flexibility may be referred to the ability of any material to undergo bending without any cracks or other failures when an external force is applied to it. In an embodiment of the present disclosure, the matrix material 108 is a curable UV acrylate. [0036] The curable UV acrylate is a special kind of material having pre-defined flexibility. The matrix material 108 brings flexibility to the rollable optical fiber ribbon 100. In an embodiment of the present disclosure, the curable UV acrylate has pre-defined properties. The curable UV acrylate is soft material having high elongation along with fast cure speed. The fast cure speed of the curable UV acrylate leads to improvement in the productivity of the rollable optical fiber ribbon 100. The cured film exhibits excellent film stability.

The cured coating of the matrix material 108 over the plurality of optical fibers 106 has a glass transition temperature of about −18 degree Celsius at 1000 Mega Pascal. In addition, the cured coating of the matrix material 108 over the plurality of optical fibers 106 has the glass transition temperature of about −28 degree Celsius at 100 Mega Pascal. Further, the cured coating of the matrix material 108 has secant modulus of about 49 Mega Pascal at 2.5% strain. Furthermore, the cured coating of the matrix material 108 has tensile strength of about 15 Mega Pascal. Moreover, the cured coating of the matrix material 108 has 55% of elongation. Also, the cured coating of the matrix material 108 has a degree of cure of about 0.5 such that the curable UV acrylate is not fully cured. In an embodiment of the present disclosure, the degree of cure represents the UV dose at 95% of ultimate secant modulus. Also, 250 micro meter films of the cured coating of the matrix material 108 absorb 3% of water when immersed in water for 24 hours. Also, the viscosity of the liquid coating of the matrix material 108 over the plurality of optical fibers 106 is about 9900 milli Pascal second at 25 degree Celsius. In addition, the density of the liquid coating of the matrix material 108 over the plurality of optical fibers 106 is about 1110 kilogram per cubic meter at 23 degree Celsius. In other words, the liquid coating of the matrix material 108 represents the matrix material in the liquid form.

In general, the glass transition is the gradual and reversible transition in amorphous materials, from a hard and relatively brittle "glassy" state into a viscous or rubbery state as the temperature is increased. In general, the secant modulus is the slope of a line drawn from the origin of the stress-strain diagram and intersecting the curve at the point of interest. In addition, the secant modulus describes the stiffness of the matrix material in the inelastic region of the stress strain diagram. In general, the tensile strength is defined as resistance of a material to breaking under tension. In general, the elongation is defined as the extension of an object or material under stress, usually expressed as a percentage of the original length. In addition, the percent elongation is measured as the maximum elongation length of the material divided by the original length of the material. In general, UV dose is the measure of the amount of germicidal light that is absorbed by a particle as it passed through a UV system. In general, the water absorption will have a negative impact on the material's nature. The absorption of water decreases the strength and durability of the material. In general, viscosity of a fluid is the measure of its resistance to gradual deformation by shear stress or tensile stress.

The rollable optical fiber ribbon 100 is a corrugated rollable optical fiber ribbon. The rollable optical fiber ribbon 100 is corrugated from a first side 110 and a second side 112 in one of a continuous manner or a discontinuous manner. In an embodiment of the present disclosure, the corrugation is done on both sides (the first side 110 and the second side 112) of the rollable optical fiber ribbon 100 (as shown in the FIG. 1). In an embodiment of the present disclosure, the first side 110 is a top or upper side and the second side 112 is a bottom or lower side of the rollable optical fiber ribbon 100. In another embodiment of the present disclosure, the corrugation is done on any one side (first side or second side) of the rollable optical fiber ribbon 100 and the other side of rollable optical fiber ribbon is flat in one of a continuous manner or a discontinuous manner. In general, the corrugation is defined as the grooving or folds on the surface of the rollable optical fiber ribbon 100. The corrugation enables the rollable optical fiber ribbon 100 to roll in a circular fashion. In general, the rolling of the optical fiber ribbon allows it to consume less space when positioned inside a buffer tube. In an embodiment of the present disclosure, the corrugation on both sides (the first side and the second side) of the rollable optical fiber ribbon 100 allows it to roll in a circular fashion from any of the two sides of the rollable optical fiber ribbon 100. In addition, the corrugation on the first side 110 and the second side 112 enables the rolling of the rollable optical fiber ribbon 100 in clockwise direction and in anticlockwise direction. In an embodiment of the present disclosure, the corrugation on both sides of the rollable optical fiber ribbon 100 makes it easy to fold the ribbon inside the buffer tube to increase number of ribbons in the cable. Moreover, the corrugation is on any one side of the rollable optical fiber ribbon 100 and the other side is flat which allows it to roll only from the side which is grooved or corrugated.

In an embodiment of the present disclosure, the rollable optical fiber ribbon 100 helps in mass fusion splicing. In general, splicing of the multiple optical fibers at once refers to the mass fusion splicing. In an example, mass fusion splicing can fuse up to all 12 optical fibers in one ribbon at once. In addition, the mass fusion splicing reduces the time of splicing for high fiber count optical fiber cable. Furthermore, a fusion splicer is used for the splicing of the optical fibers of the rollable optical fiber ribbon 100. Also, the rollable optical fiber ribbon 100 with 200 micron fibers is compatible to be used with the 250 micron fiber ribbons.

In an embodiment of the present disclosure, the rollable optical fiber ribbon 100 includes a number of optical fibers in a range of about 4 to 12. In another embodiment of the present disclosure, the number of optical fibers in the rollable optical fiber ribbon may vary. In addition, the distance between two optical fibers of the plurality of optical fibers 106 is in a range of about 35 microns to 50 microns. In an embodiment of the present disclosure, the distance between two optical fibers of the plurality of optical fibers 106 may have any suitable range. The rollable optical fiber ribbon has a height in a range of about 250 microns to 300 microns. In another embodiment of the present disclosure, the rollable optical fiber ribbon may have any suitable range of height.

In an embodiment of the present disclosure, the rollable optical fiber ribbon 100 has width of about 720 micro meter corresponding to 2 optical fibers. In an embodiment of the present disclosure, the rollable optical fiber ribbon 100 has width of about 1220 micro meter corresponding to 4 optical fibers. In an embodiment of the present disclosure, the rollable optical fiber ribbon 100 has width of about 1648 micro meter corresponding to 6 optical fibers. In an embodiment of the present disclosure, the rollable optical fiber ribbon 100 has width of about 2172 micro meter corresponding to 8 optical fibers. In an embodiment of the present disclosure, the rollable optical fiber ribbon 100 has width of about 3220 micro meter corresponding to 12 optical fibers.

In an embodiment of the present disclosure, the distance between the centres of extreme fibers corresponding to two optical fibers in the rollable optical fiber ribbon 100 is about 270 micro meters. In an embodiment of the present disclosure, the distance between the centres of extreme fibers corresponding to four optical fibers in the rollable optical fiber ribbon 100 is about 786 micro meters. In an embodiment of the present disclosure, the distance between the centres of extreme fibers corresponding to six optical fibers in the rollable optical fiber ribbon 100 is about 1310 micro meters. In an embodiment of the present disclosure, the distance between the centres of extreme fibers corresponding to eight optical fibers in the rollable optical fiber ribbon 100 is about 1834 micro meters. In an embodiment of the present disclosure, the distance between the centres of extreme fibers corresponding to twelve optical fibers in the rollable optical fiber ribbon 100 is about 2882 micro meters. In another embodiment of the present disclosure, the distance between the centres of extreme fibers vary according to the number of optical fibers in the rollable optical fiber ribbon 100. In general, the extreme fibers can be defined as the fibers which are positioned at a maximum distance from the geometrical center 102 of the rollable optical fiber ribbon 100. In other words, the extreme fibers are the optical fibers positioned at the end points of the rollable optical fiber ribbon 100.

The rollable optical fiber ribbon 100 does not hold any planarity corresponding to two optical fibers. In an embodiment of the present disclosure, the rollable optical fiber ribbon 100 has planarity of about 50 micro meters corresponding to four optical fibers. Further, the rollable optical fiber ribbon 100 has planarity of about 50 micro meters corresponding to six optical fibers. Furthermore, the rollable optical fiber ribbon 100 has planarity of about 50 micro meters corresponding to eight optical fibers. Moreover, the rollable optical fiber ribbon 100 has planarity of about 75 micro meters corresponding to twelve optical fibers. In an embodiment of the present disclosure, the planarity is achieved by UV-distribution in the curing phase. The planarity supports easy and quick ribbon splicing. In general, the planarity can be defined as the distance between the centres of two outermost optical fibers within a ribbon positioned at a maximum distance to each other along a normal axis. In addition, the normal axis is an imaginary axis drawn from the center of one extreme fiber to the center of other extreme fiber in the rollable optical fiber ribbon 100.

In an embodiment of the present disclosure, the rollable optical fiber ribbon 100 with 200 micron fibers has the pitch in the range of about 250 microns to 255 microns. In addition, the pitch in the range of about 250 microns to 255 microns enables the rollable optical fiber ribbon 100 to be used for existing splicers. Further, the matrix material 108 is applied throughout the plurality of optical fibers 106 to restrict the movement of optical fibers during splicing. In other words, the rollable optical fiber ribbon 100 has the matrix material 108 throughout the plurality of optical fibers 106 to provide flexibility to the rollable optical fiber ribbon 100 and ease the splicing operations. Furthermore, the corrugation on both sides of the rollable optical fiber ribbon 100 enables rolling of the rollable optical fiber ribbon 100. Also, the lower dimensions (such as width and height) of the rollable optical fiber ribbon 100 facilitates in the reduction of the overall diameter of the optical fiber ribbon cable. Also, the rollable optical fiber ribbon 100 with 200 micron fiber is compatible with the 250 micron fiber ribbon for splicing.

The present disclosure provides numerous advantages over the prior art. The present disclosure provides easy splicing of the rollable optical fiber ribbon with reduction in ribbon dimensions. In addition, the rollable optical fiber ribbon with 200 micron fibers is compatible with regular ribbon having 250 micron fibers. Further, the rollable optical fiber ribbon with corrugation on both sides provides rolling of the ribbon which results in the significant reduction of the cable diameters.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What we claim is:

1. A rollable optical fiber ribbon comprising:
a plurality of optical fibers positioned along a longitudinal axis of the rollable optical fiber ribbon, wherein each of the plurality of optical fibers is placed adjacent to other optical fiber of the plurality of optical fibers; and
a matrix material covering the plurality of optical fibers to provide flexibility to the rollable optical fiber ribbon, wherein the matrix material is made of curable UV acrylate having a degree of cure such that the curable UV acrylate is not fully cured,
wherein the rollable optical fiber ribbon is corrugated to enable rolling of the rollable optical fiber ribbon in circular fashion.

2. The rollable optical fiber ribbon as claimed in claim 1, wherein each of the plurality of optical fibers has a diameter of about 210±5 micron, and wherein each of the plurality of optical fibers is spaced at a pitch in a range of about 250 microns to 255 microns.

3. The rollable optical fiber ribbon as claimed in claim 1, wherein the matrix material is made of curable UV acrylate having elongation of about 55% and tensile strength of about 15 mega Pascal.

4. The rollable optical fiber ribbon as claimed in claim 1, wherein the matrix material is made of curable UV acrylate having secant modulus of about 49 mega Pascal at 2.5% strain, wherein the matrix material made of curable UV acrylate in the form of 250 micro meter film coating absorbs 3.0% water when immersed in water for 24 hours, wherein cured coating of the curable UV acrylate of the matrix material has glass transition temperature of about −18 degree Celsius at 1000 mega Pascal, wherein the cured coating of the curable UV acrylate of the matrix material has glass transition temperature of about −28 degree Celsius at 100 mega Pascal.

5. The rollable optical fiber ribbon as claimed in claim 1, wherein the matrix material made of curable UV acrylate in liquid form has a viscosity of about 9900 milli Pascal second at 25 degree Celsius, wherein the matrix material made of the curable UV acrylate in the liquid form has density of 1110 kilogram per cubic meter at 23 degree Celsius.

6. The rollable optical fiber ribbon as claimed in claim 1, wherein the rollable optical fiber ribbon has a height in a range of about 250 microns to 300 microns.

7. The rollable optical fiber ribbon as claimed in claim 1, wherein the rollable optical fiber ribbon has width of about 720 micro meter corresponding to 2 optical fibers, wherein the rollable optical fiber ribbon has width of about 1220 micro meter corresponding to 4 optical fibers, wherein the rollable optical fiber ribbon has width of about 1648 micro meter corresponding to 6 optical fibers, wherein the rollable optical fiber ribbon has width of about 2172 micro meter corresponding to 8 optical fibers, wherein the rollable optical fiber ribbon has width of about 3220 micro meter corresponding to 12 optical fibers.

8. The rollable optical fiber ribbon as claimed in claim 1, wherein each of the plurality of optical fibers is placed by a distance in a range of about 35 microns to 50 microns from each other.

9. The rollable optical fiber ribbon as claimed in claim 1, wherein the corrugation on a first side and a second side of the rollable optical fiber ribbon enables the rolling of the rollable optical fiber ribbon in clockwise direction and in anti-clock wise direction.

10. The rollable optical fiber ribbon as claimed in claim 1, wherein the rollable optical fiber ribbon comprises a number of optical fibers in a range of about 4 to 12.

11. The rollable optical fiber ribbon as claimed in claim 1, wherein the pitch is defined as a distance between centres of two adjacent fibers of the plurality of optical fibers, wherein the pitch in the range of about 250 microns to 255 microns in the rollable optical fiber ribbon enables quick splicing of the rollable optical fiber ribbon.

12. The rollable optical fiber ribbon as claimed in claim 1, wherein the matrix material is applied throughout the plurality of optical fibers to restrict the movement of fibers during splicing operations.

13. The rollable optical fiber ribbon as claimed in claim 1, wherein the rollable optical fiber ribbon facilitates mass fusion splicing operation along with reduction in cable diameter.

14. The rollable optical fiber ribbon as claimed in claim 1, wherein the pitch in the range of about 250 microns to 255 microns enables the rollable optical fiber ribbon to be used for splicers.

15. A rollable optical fiber ribbon comprising:
a plurality of optical fibers positioned along a longitudinal axis of the rollable optical fiber ribbon, wherein each of the plurality of optical fibers is placed adjacent to other optical fiber of the plurality of optical fibers, wherein each of the plurality of optical fibers with a diameter of about 210±5 is spaced at a pitch in a range of about 250 microns to 255 microns; and
a matrix material covering the plurality of optical fibers to provide flexibility to the rollable optical fiber ribbon, wherein the matrix material is made of curable UV acrylate having a degree of cure such that the curable UV acrylate is not fully cured, wherein the matrix material has elongation of about 55% and tensile strength of about 15 mega Pascal,
wherein the rollable optical fiber ribbon is corrugated to enable rolling of the rollable optical fiber ribbon in circular fashion, wherein the rollable optical fiber ribbon facilitates mass fusion splicing operation along with reduction in cable diameter, wherein the pitch in the range of about 250 microns to 255 microns enables the rollable optical fiber ribbon to be used for splicers.

16. The rollable optical fiber ribbon as claimed in claim 15, wherein the matrix material of the curable UV acrylate has secant modulus of about 49 mega Pascal at 2.5% strain, wherein the matrix material of the curable UV acrylate in the form of 250 micro meter film coating absorbs 3.0% water when immersed in water for 24 hours, wherein cured coating of the curable UV acrylate of the matrix material has glass transition temperature of about −18 degree Celsius at 1000 mega Pascal, wherein the cured coating of the matrix material of the curable UV acrylate has glass transition temperature of about −28 degree Celsius at 100 mega Pascal.

17. The rollable optical fiber ribbon as claimed in claim 15, where the rollable optical fiber ribbon has a height in a range of about 250 microns to 300 microns.

18. The rollable optical fiber ribbon as claimed in claim 15, wherein the rollable optical fiber ribbon has width of about 720 micro meter corresponding to 2 optical fibers, wherein the rollable optical fiber ribbon has width of about 1220 micro meter corresponding to 4 optical fibers, wherein the rollable optical fiber ribbon has width of about 1648 micro meter corresponding to 6 optical fibers, wherein the rollable optical fiber ribbon has width of about 2172 micro meter corresponding to 8 optical fibers, wherein the rollable optical fiber ribbon has width of about 3220 micro meter corresponding to 12 optical fibers.

19. A rollable optical fiber ribbon comprising:
a plurality of optical fibers positioned along a longitudinal axis of the rollable optical fiber ribbon, wherein each of the plurality of optical fibers is placed adjacent to other optical fiber of the plurality of optical fibers, wherein each of the plurality of optical fibers with a diameter of about 210±5 micron is spaced at a pitch in a range of about 250 microns to 255 microns; and a matrix material covering the plurality of optical fibers to provide flexibility to the rollable optical fiber ribbon, wherein the matrix material is made of curable UV acrylate, wherein the matrix material of the curable UV acrylate has elongation of about 55% and tensile strength of about 15 mega Pascal, wherein the matrix material of the curable UV acrylate has secant modulus of about 49 mega Pascal at 2.5% strain, wherein the matrix material of the curable UV acrylate has a degree of cure such that the curable UV acrylate is not fully cured, wherein the rollable optical fiber ribbon is corrugated to enable rolling of the rollable optical fiber ribbon in circular fashion, wherein the rollable optical fiber ribbon has a height in a range of about 250 microns to 300 microns, wherein the rollable optical fiber ribbon facilitates mass fusion splicing operation along with reduction in cable diameter, wherein the pitch in the range of more than 250 microns to 255 microns enables the rollable optical fiber ribbon to be used for splicers.

20. The rollable optical fiber ribbon as claimed in claim 19, wherein the matrix material of the curable UV acrylate in the form of 250 micro meter film coating absorbs 3.0% water when immersed in water for 24 hours, herein cured coating of the curable UV acrylate of the matrix material has glass transition temperature of about −18 degree Celsius at 1000 mega Pascal, wherein the cured coating of the curable UV acrylate of the matrix material has glass transition temperature of about −28 degree Celsius at 100 mega Pascal.

21. The rollable optical fiber ribbon as claimed in claim 19, wherein the rollable optical fiber ribbon has width of about 720 micro meter corresponding to 2 optical fibers, wherein the rollable optical fiber ribbon has width of about 1220 micro meter corresponding to 4 optical fibers, wherein the rollable optical fiber ribbon has width of about 1648 micro meter corresponding to 6 optical fibers, wherein the rollable optical fiber ribbon has width of about 2172 micro meter corresponding to 8 optical fibers, wherein the rollable optical fiber ribbon has width of about 3220 micro meter corresponding to 12 optical fibers.

* * * * *